United States Patent
Mallon

(10) Patent No.: US 8,569,479 B2
(45) Date of Patent: Oct. 29, 2013

(54) PROCESS FOR REDUCING THE AVERAGE MOLECULAR WEIGHT OF CELLULOSE ETHERS

(75) Inventor: Charles B. Mallon, Hillsborough, NJ (US)

(73) Assignee: Dow Global Technologies, LLC, Midland, MI (US)

( * ) Notice: Subject to any disclaimer, the term of this patent is extended or adjusted under 35 U.S.C. 154(b) by 339 days.

(21) Appl. No.: 12/304,478

(22) PCT Filed: Apr. 23, 2007

(86) PCT No.: PCT/US2007/009733
§ 371 (c)(1),
(2), (4) Date: Nov. 13, 2009

(87) PCT Pub. No.: WO2007/145709
PCT Pub. Date: Dec. 21, 2007

(65) Prior Publication Data
US 2010/0063269 A1    Mar. 11, 2010

Related U.S. Application Data

(60) Provisional application No. 60/813,503, filed on Jun. 14, 2006.

(51) Int. Cl.
*C08B 11/20* (2006.01)
*C08B 11/00* (2006.01)
*A61K 31/717* (2006.01)

(52) U.S. Cl.
USPC ............... 536/88; 536/84; 536/124; 536/56; 514/57

(58) Field of Classification Search
USPC ................... 536/124, 88, 84, 56; 514/57
See application file for complete search history.

(56) References Cited

U.S. PATENT DOCUMENTS

| | | | |
|---|---|---|---|
| 1,679,943 A | | 8/1928 | Prachel et al. |
| 1,943,461 A | | 1/1934 | Trail et al. |
| 3,251,824 A | | 5/1966 | Battista |
| 3,391,135 A | * | 7/1968 | Ouno et al. ............... 536/58 |
| 3,497,496 A | | 2/1970 | Crane |
| 4,061,859 A | | 12/1977 | Cheng |
| 4,250,305 A | | 2/1981 | Saito et al. |
| 4,357,467 A | * | 11/1982 | Sachetto et al. .......... 536/56 |
| 6,261,218 B1 | * | 7/2001 | Schulz ....................... 536/84 |
| 2001/0020090 A1 | | 9/2001 | Becker et al. |
| 2002/0168407 A1 | | 11/2002 | Koch et al. |

FOREIGN PATENT DOCUMENTS

| | | |
|---|---|---|
| EP | 0 210 917 | 2/1987 |
| GB | 1122006 | 7/1968 |
| WO | WO 01/18062 | 3/2001 |

* cited by examiner

*Primary Examiner* — Shaojia Anna Jiang
*Assistant Examiner* — Michael C Henry

(57) ABSTRACT

A process for reducing the average molecular weight of a cellulose ether comprises the step of contacting a cellulose ether with an acid to partially depolymerize it to a lower molecular weight in a diluent comprising at least 50 weight percent of an organic hydroxylic compound having at least one hydroxy group and at least two carbon atoms.

11 Claims, No Drawings

PROCESS FOR REDUCING THE AVERAGE MOLECULAR WEIGHT OF CELLULOSE ETHERS

CROSS REFERENCE TO RELATED APPLICATIONS

This application is a 371 application of PCT/US2007/009733, filed Apr. 23, 2007, which claims the benefit of U.S. Provisional Application Ser. No. 60/813,503, filed Jun. 14, 2006.

FIELD OF THE INVENTION

The present invention relates to an improved process for reducing the average molecular weight of cellulose ethers. The process employs an acid-catalyzed depolymerization step.

BACKGROUND OF THE INVENTION

Low molecular weight cellulose ethers are widely used in pharmaceutical applications or food, for example as a film-coating material on tablets, in pharmaceutical capsules or in light-colored food compositions.

A large variety of processes for producing low molecular weight cellulose ethers exist which start from a cellulose ether having a higher degree of polymerization and average molecular weight and which partially depolymerize the cellulose ether by acid catalyzed degradation, oxidative degradation or degradation by high-energy radiation or microorganism or enzymes.

A widely used method makes use of an acid for partial depolymerization. According to a process described in European Patent No. 210 917 the cellulose ether is depolymerized in essentially dry, powdery form, either by contacting it with dry hydrogen chloride gas or with an aqueous solution of hydrogen chloride.

U.S. Pat. No. 3,497,496 discloses a depolymerization process wherein a high-viscosity cellulose ether is dissolved in a solvent which essentially consists of an aliphatic carboxylic acid and sulfoacetic acid.

U.S. Patent Application Publication No. 2001/0020090 discloses an acid-catalyzed, hydrolytic depolymerization of an aqueous slurry of a cellulose ether. The water can be mixed with one or more organic suspension media, such as acetone, t-butanol and ethers. The cellulose ether is degraded in a special depolymerization apparatus equipped with a filter element to a product having a Hoeppler viscosity of not more than 50 mPa·s, measured in a 2 weight percent solution in water at 20° C.

A problem frequently observed in low molecular cellulose ethers is yellowing or discoloration. Such yellowing or discoloration can be observed in products into which the cellulose ethers are formulated. Yellowing or discoloration is easily observed in transparent pharmaceutical capsules and food products, which is highly undesirable. Several suggestions have been made to address this problem.

The International Patent Application WO 01/18062 discloses a process for acid-catalyzed depolymerization of cellulose ethers in a concentrated aqueous slurry in the optional presence of an oxidizing agent. The produced low molecular weight cellulose ethers are said to be of high purity and high whiteness.

U.S. Pat. No. 4,061,859 discloses a method of contacting a cellulose ether with gaseous HCl or another hydrogen halide gas and inhibiting the yellowing of the depolymerized product with sulfur dioxide gas. The cellulose ether can be contacted with the hydrogen halide gas as a dry powder or as a slurry in an organic solvent, such as methylene chloride, methanol, 1,1,1-trichloroethane, carbon tetrachloride, acetone, hexane or benzene. According to the examples the depolymerized product without sulfur dioxide treatment has a color of ranging from over 25 APHA to 125 APHA, measured as a 2 percent solution. The color is significantly reduced after sulfur dioxide treatment.

Since a low yellowing or discoloration of low molecular weight cellulose ethers is highly important, it would be desirable to provide another process for reducing the average molecular weight of a cellulose ether which results in a product with low yellowing or discoloration. It would be particularly desirable to provide a process which does not require the treatment with sulfur dioxide for reducing discoloration.

SUMMARY OF THE INVENTION

In one aspect the present invention relates to a process for reducing the average molecular weight of a cellulose ether which comprises the step of contacting a cellulose ether with an acid to partially depolymerize it to a lower molecular weight in a diluent comprising at least 50 weight percent of an organic hydroxylic compound having at least one hydroxy group and at least two carbon atoms.

In another aspect the present invention relates to a process for reducing the average molecular weight of ethylcellulose comprising the steps of contacting ethylcellulose with an acid to partially depolymerize it to a lower molecular weight in a diluent comprising at least 50 weight percent of an organic hydroxylic compound.

DETAILED DESCRIPTION OF THE INVENTION

The weight average molecular weight and the number average molecular weight are both reduced in the process of the present invention. The molecular weight of a cellulose ether is commonly expressed by its viscosity in a defined solution. The reduction in viscosity is an indication of the molecular weight reduction.

It has been surprisingly found that low molecular weight cellulose ethers of surprisingly low yellowing or discoloration can be achieved if the acidic partial depolymerization is conducted in a diluent which comprises at least 50, generally at least 60, preferably at least 75, and more preferably at least 90 weight percent of an organic hydroxylic compound having at least one hydroxy group and at least two carbon atoms, based on the total weight of the diluent. Most preferably, the acidic partial depolymerization is conducted in an organic hydroxylic compound having at least one hydroxy group and at least two carbon atoms in the absence of a diluent of another type. The term "a diluent which comprises at least 50 weight percent of an organic hydroxylic compound" as used herein means that the diluent may comprise one or more organic hydroxylic compounds, provided that the total of all such hydroxylic compounds is at least 50 weight percent of the total diluent weight.

Preferred organic hydroxylic compounds are alcohols of 2 to 8, preferably 2 to 6 carbon atoms, more preferably aliphatic non-cyclic alcohols, such as ethanol, isopropanol, n-propanol, n-butanol, sec.-butanol, t-butanol, n-pentanol and its isomers, n-hexanol and its isomers; or cyclic alcohols, such as methyl cyclohexanol.

Monomeric organic hydroxylic compounds are preferred, particularly monohydroxyl compounds. The most preferred organic hydroxylic compounds are ethanol and isopropanol.

Furthermore, it has been surprisingly found that low molecular weight ethylcellulose of surprisingly low yellowing or discoloration can be achieved if the acidic partial depolymerization is conducted in a diluent which comprises at least 50, generally at least 60, preferably at least 75, most preferably at least 90 weight percent of an organic hydroxylic compound, based on the total weight of diluents. Most preferably, the acidic partial depolymerization is conducted in one or more organic hydroxylic compounds in the absence of a diluent of another type. The hydroxylic compound can be methanol or an above-described hydroxylic compound having at least one hydroxy group and at least two carbon atoms.

The diluent may also comprise one ore more organic solvents other than organic hydroxylic compounds, however their amount should not be more than 50, generally not more than 40, preferably not more than 25, most preferably not more than 10 weight percent, based on the total weight of diluents. Useful other diluents are for example ethers, such as dimethoxyethane, diethyl ethers or higher homologues; or cyclic ethers, such as dioxane; ketones, such as acetone; halocarbons or halogenated hydrocarbons, preferably chlorinated aliphatic or aromatic hydrocarbons, such as methylene chloride, 1,1,1-trichloroethane, carbon tetrachloride, or monochlorobenzene, or non-cyclic hydrocarbons, such as hexane; saturated cyclic hydrocarbons, such as cyclohexane; or aromatic hydrocarbons, such as toluene or benzene. Most preferably the reaction diluent is only an organic hydroxylic compound disclosed further above and does not comprise any of the other above-mentioned solvents.

In one aspect of the present invention the partial depolymerization is useful for water-soluble cellulose ethers. The term "water-soluble" as used herein means that the cellulose ether prior to the partial depolymerization has a solubility in water of at least 2 grams in 100 grams of distilled water at 25° C. and 1 atmosphere. Preferred water-soluble cellulose ethers are water-soluble carboxy-$C_1$-$C_3$-alkyl celluloses, such as carboxymethyl celluloses; water-soluble carboxy-$C_1$-$C_3$-alkyl hydroxy-$C_1$-$C_3$-alkyl celluloses, such as carboxymethyl hydroxyethyl celluloses; water-soluble $C_1$-$C_3$-alkyl celluloses, such as methylcelluloses; water-soluble $C_1$-$C_3$-alkyl hydroxy-$C_{1-3}$-alkyl celluloses, such as hydroxyethyl methylcelluloses, hydroxypropyl methylcelluloses or ethyl hydroxyethyl celluloses; water-soluble hydroxy-$C_{1-3}$-alkyl celluloses, such as hydroxyethyl celluloses or hydroxypropyl celluloses; water-soluble mixed hydroxy-$C_1$-$C_3$-alkyl celluloses, such as hydroxyethyl hydroxypropyl celluloses, water-soluble mixed $C_1$-$C_3$-alkyl celluloses, such as methyl ethyl celluloses, or water-soluble alkoxy hydroxyethyl hydroxypropyl celluloses, the alkoxy group being straight-chain or branched and containing 2 to 8 carbon atoms. The more preferred water-soluble cellulose ethers are methylcellulose, hydroxyethyl cellulose, hydroxypropyl cellulose, hydroxyethylmethyl cellulose, hydroxypropylmethyl cellulose, hydroxybutylmethyl cellulose, ethylhydroxyethyl cellulose, carboxymethyl cellulose, and carboxymethyl hydroxyethylcellulose. A particularly useful cellulose ether in making pharmaceutical compositions, such as capsules, is hydroxypropylmethylcellulose. Particularly useful cellulose ethers in making food compositions are methylcellulose and hydroxypropylmethylcellulose. Such cellulose ethers and ways of producing them are well-known in the art.

The water-soluble cellulose ether used as a starting material in the process of the present invention generally has a viscosity of 50 mPa·s or more, preferably of 200 mPa·s or more, more preferably of 500 mPa·s or more, most preferably of 1,000 mPa·s or more, measured in a two weight percent aqueous solution at 20° C. using an Ubbelohde viscometer. Depending on the viscosity of the starting material, the water-soluble cellulose ether is generally depolymerized to a cellulose ether of less than 100 mPa·s, preferably of less than 50 mPa·s, more preferably of less than 20 mPa·s. By the partial depolymerization of the process of the present invention generally a reduction in viscosity of the water-soluble cellulose ether of at least 20 percent, preferably at least 50 percent, more preferably at least 75 percent, and most preferably at least 90 percent is achieved, based on the viscosity of the water-soluble cellulose ether prior to the partial depolymerization step.

In another aspect of the present invention the partial depolymerization is useful for water-insoluble cellulose ethers, such as ethylcellulose, propylcellulose or butylcellulose. Such cellulose ethers and ways of producing them are well-known in the art. The term "water-insoluble" as used herein means that the cellulose ether prior to the partial depolymerization has a solubility in water of less than 2 grams, preferably less than 1 gram in 100 grams of distilled water at 25° C. and 1 atmosphere. The water-insoluble cellulose ether, such as ethylcellulose, which is used as a starting material in the process of the present invention preferably has a viscosity of from 4 to 400 mPa·s, more preferably from 4 to 100 mPa·s, most preferably from 5 to 50 mPa·s, measured as a 5 weight percent solution at 25° C. in a mixture of 80 volume percent toluene and 20 volume percent ethanol. The concentration of the water-insoluble cellulose ether is based on the total weight of toluene, ethanol and water-insoluble cellulose ether. The viscosity of ethylcellulose is measured using Ubbelohde tubes as outlined in ASTM D914-00 and as further described in ASTM D446-04, which is referenced in ASTM D914-00. By the partial depolymerization of the process of the present invention generally a reduction in viscosity of the water-insoluble cellulose ether of at least 20 percent, preferably at least 30 percent, more preferably at least 50 percent is achieved, based on the viscosity of the starting material used in the partial depolymerization step. The water-insoluble cellulose ether, such as ethylcellulose, which is obtained according to the process of the present invention generally has a viscosity of from 1.0 mPa·s, preferably from 1.5 mPa·s, more preferably from 2.0 mPa·s; to 10 mPa·s, preferably to 7 mPa·s, more preferably to 4 mPa·s, measured as a 5 weight percent solution at 25° C. in a mixture of 80 volume percent toluene and 20 volume percent ethanol.

The weight ratio between the diluent used in the process of the present invention and the cellulose ether preferably is from 20:1 to 1:2, more preferably from 10:1 to 1:1.

In the case of a water-soluble cellulose ether it is particularly preferred to choose the amount and type of diluent such that the water-soluble cellulose ether does not swell or dissolve in the diluent to a substantial degree at the depolymerization temperature. Preferably, the water-soluble cellulose ether is slurried in the above-mentioned diluent.

In the case of a water-insoluble cellulose ether it is particularly preferred to choose the amount and type of diluent such that the water-insoluble cellulose ether dissolves in the diluent at the depolymerization temperature. In view of the teaching herein, the skilled artisan knows what specific diluent and amount to select for a given cellulose ether.

Preferred acids for the partial depolymerization of the cellulose ether, i.e., for the reduction of its molecular weight, are strong inorganic acid. Preferred inorganic acids are hydrochloric acid, sulfuric acid, nitric acid, phosphoric acid and blends thereof. Particularly preferred is hydrochloric acid in gaseous form or as a concentrated aqueous solution. Preferably from 0.1 to 5 percent, more preferably from 0.2 to 2 percent of acid are used, based on the weight of cellulose ether. The amount of acid, based on the weight of diluent, preferably is from 0.01 to 5 percent.

The reduction of the average molecular weight of the cellulose ether is preferably conducted at a temperature of from 50 to 130° C., more preferably from 60 to 110° C., most preferably from 60 to 90° C. The duration of the process for molecular weight reduction preferably is from 0.5 to 10 hours, more preferably from 2 to 6 hours. Most preferably, the process is conducted under the atmosphere of an inert gas, such as nitrogen or a noble gas. The use of an inert gas in the depolymerization reactor is particularly desired in the case of water-soluble cellulose ethers.

Following the partial depolymerization the reaction mixture is typically cooled or allowed to cool to ambient temperature and the cellulose ether of reduced molecular weight separated from the reaction diluent. If the cellulose ether is insoluble in the reaction diluent and the partial depolymerization is run as a slurry process, for example in the case of water-soluble cellulose ethers, the cellulose ether is typically separated from the reaction diluent by centrifugation or filtration. If the cellulose ether is soluble in the reaction diluent and a solution depolymerization is conducted, for example in the case of water-insoluble cellulose ethers such as ethylcellulose, the cellulose ether is precipitated from the reaction diluent by addition of a liquid in which the cellulose ether is not soluble, such as water or hexane, generally followed by filtration or centrifugation.

Before, during and/or after separating the partially depolymerized cellulose ether from the reaction diluent, it can be contacted with a basic compound to partially or substantially neutralize any remaining acid. Preferred basic compounds are hydroxides, such as sodium hydroxide or potassium hydroxide. Other preferred basic compounds are carbonates or bicarbonates. The sodium salts thereof are preferred. In one preferred embodiment of the invention the basic compound is added to the reaction mixture before separating the partially depolymerized cellulose ether from the reaction diluent. In another preferred embodiment the basic compound is added to a liquid which is used to precipitate the cellulose ether.

Optionally a oxidizing agent is additionally added to the cellulose ether before, during and/or after partial depolymerization with the acid. A preferred oxidizing agent is hydrogen peroxide or a salt thereof. Other peroxo compounds, such as sodium peroxosulfate, or perborates, sodium chlorite, halogens, or halogen oxides are also useful. The oxidizing agent is typically used in an amount of from 0.01 to 20 percent, preferably from 0.02 to 10 percent, based on the weight of the cellulose ether. The optional amount of an oxidizing agent can further reduce the discoloration of the cellulose ether of reduced average molecular weight. However, the use of an oxidizing agent is not necessary to obtain a partially depolymerized cellulose ether of high whiteness. Accordingly, the average molecular weight of a cellulose ether is generally reduced in the absence of an oxidizing agent.

The cellulose ether of reduced molecular weight may be washed and optionally dried in a known manner. Useful washing liquids are known in the art. Preferably the cellulose ether is not soluble in the washing liquid at the temperature at which the cellulose ether is washed.

When the process of the present invention is applied to a water-soluble cellulose ether, it is preferably washed in an organic hydroxylic diluent comprising at least one hydroxy group and at least two carbon atoms. More preferably, the same organic compound is used for washing as is used in the depolymerization step.

When the process is applied to a water-insoluble cellulose ether, a preferred washing liquid is water which optionally contains an above-mentioned basic compound.

The process of the present invention provides partially depolymerized cellulose ethers of high yield and high whiteness. At least in the preferred embodiment of the process, partially depolymerized cellulose ethers of a yield of at least 85 percent, typically at least 90 percent, and in most instances even at least 95 percent are obtained. 2 weight percent aqueous solution of the water-soluble cellulose ethers generally have a whiteness of less than 20 APHA, typically even less than 15 APHA. 5 weight percent solutions of the water-insoluble cellulose ethers in a mixture of 80 volume percent toluene and 20 volume percent ethanol generally have a whiteness of less than 100 APHA.

This excellent whiteness is achieved in the absence of a treatment with sulfur dioxide and in the absence of a treatment with an oxidizing agent that have been disclosed in the prior art for obtaining partially depolymerized cellulose ethers of improved whiteness. Since such additional treatments add to cost, it is preferred to reduce the average molecular weight of a cellulose ether in the absence of a sulfur dioxide treatment and in the absence of an oxidizing agent.

The present invention is further illustrated by the following examples which are not to be construed to limit the present invention. Unless otherwise indicated, all parts and percentages are by weight.

Unless otherwise indicated, the viscosity of ethylcellulose is measured as a 5 weight percent solution at 25° C. in a mixture of 80 volume percent toluene and 20 volume percent ethanol using a Brookfield viscometer.

The viscosity of the hydroxypropyl methylcellulose is measured in a 2 weight percent aqueous solution at 20° C. using an Ubbelohde viscometer.

EXAMPLE 1

1500 g of a powdered ethylcellulose which is commercially available from The Dow Chemical Company under the trademark ETHOCEL Std 10 is used for depolymerization. It has an ethoxyl content of 48.0-49.5 percent and a measured viscosity of about 10 mPa·s. The ethylcellulose is dissolved in 4500 g of ethanol in a 12 liter round bottom flask. 112.5 g of concentrated hydrochloric acid (37 percent) is added with stirring and the solution is heated to 76° C. under nitrogen and held for 30 minutes. The solution is cooled and slowly added to 200 liters of water containing 152 g of sodium bicarbonate (one equivalent). The resulting solid is collected by filtration and dried in a vacuum oven. The product has a viscosity of 3.5 mPa·s, measured as a 5 percent solution in a mixture of 80 volume percent toluene and 20 volume percent ethanol, and is white in color to the naked eye. The yield is 94 percent.

EXAMPLE 2

75 g of ethylcellulose which is commercially available from The Dow Chemical Company under the trademark ETHOCEL Std 10 is added to 225 g of methanol in a flask and stirred until the ethylcellulose dissolves. 5.6 g of concentrated hydrochloric acid (37 percent) is added and the solution is heated to 65° C. for 1 hour with stirring under nitrogen. The solution is cooled and the product recovered by precipitation in water. The recovered product has a viscosity of 4 mPa·s, measured as a 5 weight percent solution in a mixture of 80 volume percent toluene and 20 volume percent ethanol, and is white in color to the naked eye. The yield is 91 percent.

EXAMPLE 3

50 g of ethylcellulose which is commercially available from The Dow Chemical Company under the trademark ETHOCEL Std 4 are used for depolymerization. It has an ethoxyl content of 48.0-49.5 percent and a measured viscosity of about 4 mPa·s. The ethylcellulose is added to a stirred flask containing 150 grams of isopropanol. Once the ethylcellulose dissolves, a nitrogen purge is started and the mixture is heated to reflux at 81° C. 3 g of concentrated hydrochloric acid (37 percent) is added and heating continues for 2 hours. Precipitation of the resulting solution into 3 liters of water containing 3.5 grams of sodium bicarbonate, followed by washing and drying, produces 47 grams of product with a viscosity of 3 mPa·s, measured as a 5 weight percent solution in a mixture of 80 volume percent toluene and 20 volume percent ethanol, and is white in color to the naked eye.

COMPARATIVE EXAMPLE A 75 g of ethylcellulose which is commercially available from The Dow Chemical Company under the trademark ETHOCEL Std 10 is added to 225 g of hexane. The ethylcellulose does not dissolve. 5.6 g of concentrated hydrochloric acid (37 percent) is added and the solution is heated to 65° C. for 1 hour with stirring under nitrogen. No change in viscosity of the ethylcellulose is observed, meaning that partial depolymerization to a lower molecular weight does not occur.

COMPARATIVE EXAMPLE B 22 g of ethylcellulose which is commercially available from The Dow Chemical Company under the trademark ETHOCEL Std 10 is added to 200 g of 1,1,1-trichloroethane and stirred until the ethylcellulose dissolves. 1.65 g of concentrated hydrochloric acid (37 percent) is added and the solution is heated to 70° C. for 1 hour with stirring under nitrogen. Ethylcellulose is recovered by precipitation in hexane. The viscosity of the recovered ethylcellulose is 10 mPa·s, indicating that no reaction between ethylcellulose and hydrochloric acid has occurred.

EXAMPLES 4-6 AND COMPARATIVE EXAMPLES C-E

Example 1 is repeated, but using the reaction mixtures and conditions as listed in Table 1 below. To assess the effectiveness of the depolymerization, the viscosity of a 15 weight percent solution of ethylcellulose in toluene is measured at 25° C. using a Brookfield viscometer.

TABLE 1

| (Comp.) Example | ETHOCEL Std 10, g | Diluent, g | Concentrated hydrochloric acid, g | Reaction Temp., ° C. | Reaction Time, hours | Product Viscosity, 15% Solution |
| --- | --- | --- | --- | --- | --- | --- |
| 4 | 40 | Ethanol, 180 g | 3.34 | 78 | 5 | 6 mPa·s |
| 5 | 40 | Ethanol, 180 g | 3.32 | 78 | 1 | 15 mPa·s |
| 6 | 40 | Ethanol, 180 g | 1.62 | 78 | 1 | 25 mPa·s |
| C | 20 | Water, 200 g | 1.65 | 80 | 6 | 530 mPa·s |
| D | 20 | Water/Ethanol 160 g/40 g | 1.63 | 81 | 4.5 | 238 mPa·s |
| E | 40 | Water/Ethanol 280 g/120 g | 3.4 | 82 | 22 | 235 mPa·s |

EXAMPLES 7-14

Example 1 is repeated, but 40 g of the ethylcellulose is contacted with 180 g of ethanol. The amount of concentrated hydrochloric and the reaction conditions are listed in Table 2 below. The results in Table 2 below illustrate that ethylcellulose of reduced molecular weight and white color can be obtained at a high yield.

TABLE 2

| Example | Reaction Time (hours) | Reaction Temperature (° C.) | Concentrated hydrochloric acid, g | 5% Solution Viscosity (mPa·s) | 5% Solution Color, (APHA) | Recovery (%) |
|---|---|---|---|---|---|---|
| 7 | 0.5 | 78 | 1 | 5.5 | 49 | 95.5 |
| 8 | 0.5 | 60 | 1 | 8.5 | 47 | 96.7 |
| 9 | 2 | 78 | 3 | 2.5 | 83.5 | 86.4 |
| 10 | 2 | 60 | 3 | 5.5 | 74.3 | 96 |
| 11 | 0.5 | 60 | 3 | 7.5 | 50.6 | 95.5 |
| 12 | 0.5 | 78 | 3 | 7.5 | 48.4 | 96.1 |
| 13 | 2 | 60 | 1 | 6.5 | 65.2 | 95.4 |
| 14 | 2 | 78 | 1 | 3.5 | 78 | 94.3 |

EXAMPLES 15-18

Example 1 is repeated using the conditions in Table 3 below. The results in Example 1 and in Table 3 below illustrate that also on larger scale ethylcellulose of reduced molecular weight can be obtained at a high yield which is white in color to the naked eye. The smaller recovery in Example 15 than in Examples 16-18 is due to some loss of material during filtration.

TABLE 3

| Example | ETHOCEL Std 10, g | Ethanol (g) | Conc. hydrochloric acid, g | Reaction Temp. (° C.) | Time, hours | Recovery (%) | Viscosity 5% solution (mPa·s) |
|---|---|---|---|---|---|---|---|
| 15 | 1720 | 5160 | 129 | 76 | 2 | 80 | 2.5 |
| 16 | 1800 | 5400 | 45 | 76 | 2 | 89 | 3.5 |
| 17 | 1500 | 4500 | 37.5 | 60 | 2 | 96 | 6.5 |
| 18 | 1500 | 4500 | 112.5 | 60 | 2 | 94 | 4 |

EXAMPLE 19

20 g of hydroxypropyl methylcellulose is added to 200 grams of isopropyl alcohol in a 500 ml. round bottom flask equipped with an overhead stirrer, nitrogen inlet and condenser. The hydroxypropyl methylcellulose is commercially available from The Dow Chemical Company under the trademark METHOCEL E4M and has a methoxyl substitution of 28-30 percent, a hydroxypropoxyl substitution of 7-12 percent and a viscosity of about 4000 mPa·s. 4 g of concentrated hydrochloric acid (37 percent) is added with stirring and the solution is heated to 80° C. under nitrogen and held for 6 hours. The mixture is cooled, filtered, washed with more isopropanol and dried in a vacuum oven to less than 1 weight percent volatiles. The product is dissolved in water at 2 weight percent and its viscosity is found to be 4 mPa·s and its color to be 8 APHA.

EXAMPLES 20-27

Example 19 is repeated, except that the reaction time, the temperature and the concentration of the hydrochloric acid are changed, as listed in Table 4 below. The results in Table 4 below illustrate that hydroxypropyl methylcellulose of excellent whiteness is achieved. The yield is more than 90% in each of the examples.

TABLE 4

| Example | Reaction Time (hours) | Reaction Temperature (° C.) | Concentrated hydrochloric acid, g | 2% Solution Viscosity (mPa·s) | 2% Solution Color, (APHA) |
|---|---|---|---|---|---|
| 20 | 2 | 60 | 8 | 226 | 8.6 |
| 21 | 6 | 81 | 8 | 2.1 | 13.1 |

TABLE 4-continued

| Example | Reaction Time (hours) | Reaction Temperature (° C.) | Concentrated hydrochloric acid, g | 2% Solution Viscosity (mPa·s) | 2% Solution Color, (APHA) |
|---|---|---|---|---|---|
| 22 | 2 | 81 | 4 | 8 | 7.5 |
| 23 | 6 | 60 | 4 | 151 | 8.8 |
| 24 | 2 | 81 | 8 | 5 | 12.8 |
| 25 | 6 | 81 | 4 | 3 | 7.8 |
| 26 | 6 | 60 | 8 | 40 | 7.3 |
| 27 | 2 | 60 | 4 | 666 | 7.7 |

EXAMPLE 28

40 g of the same hydroxypropyl methylcellulose as in Example 19 is slurried in 100 g of isopropanol. 0.4 g of concentrated hydrochloric acid is added. After the addition of the concentrated hydrochloric acid the slurry is filtered. The wet cake is placed in a round bottom flask. The flask is placed on a rotary evaporator and immersed in a hot water bath kept at 80° C. and rotated for 5 hours. Air is excluded from the system. The resulting polymer has a viscosity of 5.5 mPa·s, measured as a 2 weight percent aqueous solution at 20° C. using an Ubbelohde viscometer, and an APHA color of 9.5 as a 2 weight percent aqueous solution.

This example illustrates that the depolymerization reaction can be run at a high cellulose ether/diluent ratio.

COMPARATIVE EXAMPLE F 20 g of the same hydroxypropyl methylcellulose as in Example 19 is added to 200 grams of methanol. A very viscous solution is formed which does not mix well.

COMPARATIVE EXAMPLE G 20 g of the same hydroxypropyl methylcellulose as in Example 19 is added to 200 grams of hexane. 0.8 g of concentrated hydrochloric acid is added. The mixture is heated and stirred under nitrogen for 6 hours at 65° C. The recovered product is found to have a viscosity of 7 mPa·s, measured as a 2 weight percent aqueous solution, but the color of this solution is 118 APHA.

COMPARATIVE EXAMPLE H 20 g of the same hydroxypropyl methylcellulose as in Example 19 is added to 200 grams of 1,1,1-trichloroethane. 0.8 g of concentrated hydrochloric acid is added. The mixture is heated and stirred under nitrogen for 6 hours at 65° C. The recovered product is found to have a viscosity of 13 mPa·s, measured as a 2 weight percent aqueous solution, but the color of this solution is 213 APHA.

EXAMPLE 29

20 g of the same hydroxypropyl methylcellulose as in Example 19 is added to a 500 ml round bottom flask which is equipped with an overhead stirrer, nitrogen inlet and condenser and which contains 200 grams of isopropanol. 1.1 grams of sulfuric acid, 98 percent pure, is added and nitrogen flow through the flask is started. The slurry is heated to reflux, about 82° C., and held at that temperature for 5.5 hours. The mixture is cooled to 30° C. and 2.2 grams of sodium bicarbonate is added. The resulting slurry is filtered and the solids are dried in a vacuum oven at 35° C. The resulting product has a viscosity of 4 mPa·s and a color of 11 APHA, measured as a 2 weight percent aqueous solution.

COMPARATIVE EXAMPLE I 20 g of the same hydroxypropyl methylcellulose as in Example 19 is added to a 500 ml round bottom flask which is equipped with an overhead stirrer, nitrogen inlet and condenser and which contains 200 grams of 1,2-dimethoxyethane. 1.7 grams of sulfuric acid, 98 percent pure, is added and nitrogen flow through the flask is started. The slurry is heated to reflux, about 82° C., and held at that temperature for 6.5 hours. The mixture is cooled to 30° C. and 2.2 grams sodium bicarbonate is added. The resulting slurry is filtered and the solids are dried in a vacuum oven at 35° C. The resulting product has a viscosity of 3.5 mPa·s, measured as a 2 weight percent aqueous solution, but is yellow to light brown in color.

The invention claimed is:

1. A process for reducing the average molecular weight of a cellulose ether comprising the steps of:
forming a slurry with a cellulose ether and a diluent, and
contacting the cellulose ether with an acid to partially depolymerize it to a lower molecular weight, said diluent comprising at least 75 weight percent of an organic hydroxylic compound having at least one hydroxy group and at least two carbon atoms,
provided that the weight ratio between the diluent and the cellulose ether in the slurry is from 10:1 to 1:1.

2. The process of claim 1 wherein the organic hydroxylic compound is an aliphatic non-cyclic alcohol of 2 to 8 carbon atoms.

3. The process of claim 1 wherein the diluent comprises at least 90 percent of the organic hydroxylic compound.

4. The process of claim 1 wherein the cellulose ether is methylcellulose, hydroxyethyl cellulose, hydroxypropyl cellulose, hydroxyethyl methylcellulose, hydroxypropyl methylcellulose, hydroxybutyl methylcellulose, ethyl hydroxyethylcellulose, carboxymethyl cellulose, or carboxymethyl hydroxyethylcellulose.

5. The process of claim 4 wherein a reduction in viscosity of the cellulose ether of at least 50 percent is achieved, based on its viscosity prior to the partial depolymerization step.

6. The process of claim 4 wherein the diluent in the slurry of the cellulose ether is isopropyl alcohol.

7. The process of claim 1 wherein the cellulose ether is ethylcellulose.

8. The process of claim 7 wherein ethylcellulose having a viscosity of from 4 to 400 mPa·s, measured as a 5 weight percent solution at 25° C. in a mixture of 80 volume percent toluene and 20 volume percent ethanol, is partially depolymerized to an ethylcellulose having a viscosity of from 1.0 to 10 mPa·s, with the proviso that the viscosity of the ethylcellulose is reduced at least 20 percent, based on its viscosity prior to the partial depolymerization step.

9. The process of claim 8 wherein ethylcellulose is dissolved in ethanol or isopropanol, partially depolymerized with an acid and recovered from the solution by adding water.

10. The process of claim 1 wherein the cellulose ether is contacted with the acid in the diluent under an atmosphere of an inert gas.

11. A process for reducing the average molecular weight of ethylcellulose comprising the steps of:
dissolving an ethylcellulose in a diluent, and
contacting the ethylcellulose with an acid to partially depolymerize it to a lower molecular weight, said diluent comprising at least 75 weight percent of an organic hydroxylic compound selected from propanol, butanol, pentanol, hexanol, or cyclic alcohols having up to 8 carbon atoms.

* * * * *